(12) United States Patent
Scheinert et al.

(10) Patent No.: US 7,555,300 B2
(45) Date of Patent: Jun. 30, 2009

(54) BASE STATION INTERFERENCE CONTROL USING TIMESLOT RESOURCE MANAGEMENT

(75) Inventors: Stefan Scheinert, San Diego, CA (US); Daniel M. Bender, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 11/016,705

(22) Filed: Dec. 17, 2004

(65) Prior Publication Data
US 2008/0130593 A1 Jun. 5, 2008

Related U.S. Application Data

(63) Continuation-in-part of application No. 10/280,733, filed on Oct. 25, 2002, now Pat. No. 7,117,015.

(60) Provisional application No. 60/531,419, filed on Dec. 19, 2003.

(51) Int. Cl.
H04Q 7/20 (2006.01)

(52) U.S. Cl. .................... 455/450; 455/451; 455/452.1; 455/452.2; 455/561; 455/67.13; 370/321; 370/326; 370/336; 370/347; 370/442

(58) Field of Classification Search ................. 455/450, 455/451, 452.1, 452.2, 453, 454, 464, 561, 455/522, 62, 502, 509, 512, 513, 514, 560, 455/447, 63.1, 63.3, 67.11, 67.13; 370/318, 370/321, 337, 347, 326, 336, 442
See application file for complete search history.

(56) References Cited

U.S. PATENT DOCUMENTS

| | | | | |
|---|---|---|---|---|
| 5,280,630 A | * | 1/1994 | Wang | 455/452.2 |
| 5,920,557 A | * | 7/1999 | Hirata | 370/350 |
| 5,959,983 A | * | 9/1999 | Saito et al. | 370/337 |
| 6,301,242 B1 | | 10/2001 | Lindsay et al. | |
| 6,400,704 B2 | * | 6/2002 | Mikuni et al. | 370/347 |
| 6,449,484 B1 | * | 9/2002 | Grubeck et al. | 455/450 |
| 6,519,240 B1 | * | 2/2003 | Dillinger et al. | 370/337 |
| 6,567,459 B1 | * | 5/2003 | Hakkinen et al. | 375/132 |
| 6,577,617 B1 | * | 6/2003 | Ue et al. | 370/347 |
| 6,591,108 B1 | * | 7/2003 | Herrig | 455/452.1 |
| 6,684,079 B1 | * | 1/2004 | Aretz et al. | 455/502 |

(Continued)

FOREIGN PATENT DOCUMENTS

EP 1035742 9/2000

(Continued)

OTHER PUBLICATIONS

PCT/US04/42509 ISR and WO mailed Jul. 31, 2006.

(Continued)

*Primary Examiner*—Charles N Appiah
*Assistant Examiner*—Olumide T Ajibade Akonai
(74) *Attorney, Agent, or Firm*—Blakely, Sokoloff, Taylor & Zafman LLP (57) ABSTRACT

A personal base station configured to connect to the Internet and establish a small area of wireless coverage including means for controlling interference with neighboring personal base stations using a timeslot management mechanism. Timeslot management mechanisms include timeslot interference detection, timeslot power reduction, timeslot allocation, timeslot offset calibration, and timeslot synchronization management that minimizes the number of frequencies required to control inter-cell interference between neighboring personal base stations.

6 Claims, 7 Drawing Sheets

U.S. PATENT DOCUMENTS

| | | |
|---|---|---|
| 6,987,750 B2* | 1/2006 | Soderkvist et al. .......... 370/337 |
| 7,158,807 B2* | 1/2007 | Marinier ..................... 455/522 |
| 7,236,793 B2* | 6/2007 | Amalfitano et al. ......... 455/453 |
| 7,356,355 B2* | 4/2008 | Ishida ..................... 455/562.1 |
| 2002/0015393 A1* | 2/2002 | Pan et al. .................... 370/335 |
| 2002/0055367 A1* | 5/2002 | Hamabe et al. ............. 455/522 |
| 2002/0119782 A1* | 8/2002 | Voyer ......................... 455/450 |
| 2002/0154621 A1 | 10/2002 | Laroia et al. |
| 2003/0100269 A1* | 5/2003 | Lehtinen et al. ............... 455/69 |
| 2003/0220103 A1* | 11/2003 | Kim et al. ................ 455/422.1 |

OTHER PUBLICATIONS

Official Letter for United Kingdom Patent Application No. GB0610523.3 mailed Apr. 24, 2008, 1 pg.

Official Letter for United Kingdom Patent Application No. GB0610523.3 mailed Oct. 23, 2008, 3 pgs.

* cited by examiner

Assumptions
PBS 1 and PBS 2 are using the same frequency
MS1 is sending interfering signals to PBS2

Abbreviations:
APT = Apartment
PBS = Personal Base Station
MS = Mobile Station
PBS = Personal Base Station

Assumptions:
Procedures shown in this diagram are continued in Figure 4 showing additional Startup and Operational procedures and events Abbreviations:
DB = Database
ts = timeslot
BCCH = Broadcast Control Channel
TCH = Traffic Channel
PBS = Personal Bast Station

BASE STATION INTERFERENCE CONTROL USING TIMESLOT RESOURCE MANAGEMENT

RELATED APPLICATIONS

This application claims the benefit of U.S. provisional application No. 60/531,419, filed Dec. 19, 2003. This application is a continuation-in-part of U.S. non-provisional application Ser. No. 10/280,733, filed Oct. 25, 2002 now U.S. Pat. No. 7,117,015.

FIELD OF THE INVENTION

The present invention relates generally to radio or wireless communications and, more particularly, to interference control by use of timeslot management for pico/personal base stations integrated into conventional wireless networks.

BACKGROUND OF THE INVENTION

In rolling out a conventional wireless carrier network, one of the primary considerations is the process of selecting and allocating frequency channels for all of the cellular base stations within the system. This process, which is called frequency reuse or frequency planning, depends on various factors such as frequencies available for use, cell geometry, type of antenna, and topography.

A key parameter in determining frequency reuse is the Carrier-to-Interference (C/I) ratio, which measures the ratio of the power level of the radio frequency carrier to the power level of the interference signal in the channel. The C/I ratio helps to determine the maximum interference level that will still allow a cellular system configuration to provide an acceptable quality of service.

In rolling out a new GSM outdoor macro base station network, assuming a standard 4/12 geometry cell cluster reuse pattern (see FIG. 1), a minimum of 12 frequencies is typically required to keep the quality of service within tolerable limits. For the GSM network, that means meeting or exceeding the GSM 9 db C/I ratio specification.

In rolling out a new GSM outdoor micro or pico base station network, one of several frequency planning strategies may be implemented. One strategy is to allocate new (unused) frequencies to the micro/pico cells, depending on the availability of unused frequencies in the carrier's inventory. Alternatively, the carrier may choose to share the same frequencies allocated to the existing macro cell network. In either case, assuming a standard 4/12 geometric cell cluster reuse pattern, a minimum of 9 to 12 frequencies is typically required to meet or exceed the GSM 9 db C/I quality of service specification for the micro/pico cell network. The reason for the reduced number of frequencies is that the micro or pico cells are deployed below the clutter height, which means a higher signal loss to more distant areas, effectively reducing the interference level.

When considering the rollout of yet another network of base stations, specifically indoor pico or personal base stations, the superior frequency planning strategy would be to allocate new (unused) frequencies, in order to avoid interference from the more powerful outdoor macro stations, particularly in high rise structures. Although allocating new (unused) frequencies is a superior strategy (easier to implement) than sharing the frequencies with the macro- and micro cells when rolling out a new indoor network, it is not always feasible, for several reasons.

First, most carriers do not own enough additional frequencies to implement the unused frequency strategy. Typically, the only unused frequencies in a carrier bandwidth inventory are the two "guard" frequencies on the extreme ends of the carrier's licensed bandwidth. These frequencies, however, are typically unusable in a practical sense because of potential interference from frequencies licensed and deployed by other carriers. Secondly, even if these two guard frequencies were used, they would not allow the carrier to meet or exceed the current GSM 9 db C/I ratio quality of service specification discussed above.

From the carriers point of view, an ideal solution to their frequency planning problem would be a method or mechanism allowing the rollout of a GSM network of indoor pico or personal base stations that fulfills the following criteria: a) use of only one or two unused frequencies, preferably guard frequencies, b) satisfaction of the GSM 9 db C/I ratio qualify of service specification, and c) seamless integration with the carriers existing outdoor macro/micro network.

Conventional Timeslot Allocation Management: Conventional networks use time slot allocation management to help control mobile station interference within a single cell, rather than between cells. A base station or base station controller allocates time slots within channels to all of the mobile stations within its cell, ensuring that no two mobiles are transmitting or receiving signals within the same time slots, thereby avoiding any interference between mobile stations within a particular cell. In addition, the mobile station measures the signal strength or signal quality (based on the Bit Error Ratio), and passes the information to the Base Station Controller, which ultimately decides if and when the power level should be changed or a handover should be initiated.

Conventional Channel Structure and Use of Timeslots: Since radio spectrum is a limited resource shared by all users, a method must be devised to divide up the bandwidth among as many users as possible. The method chosen by GSM is a combination of Time and Frequency Division Multiple Access (TDMA/FDMA). The FDMA part involves division by frequency of the total MHz bandwidth into allocatable carrier frequencies of 200 kHz bandwidth. One or more carrier frequencies are then assigned to each base station. Each carrier frequency consists of 2 200 kHz channels separated by a duplex distance (e.g. 45 MHz in GSM 900). One frequency is used for the downlink (BTS→MS) and the other frequency is used for the uplink (MS→BTS). The pair of one 200 kHz channels is called a duplex channel.

Each of these duplex channels is then divided in time, using a TDMA scheme, into eight time slots. Groups of eight consecutive time slots form TDMA frames, each with duration of 4.615 ms. Each time slot is a burst period (BP) during which a transmission burst of modulated bits is broadcast. One time slot is used for transmission by the mobile (uplink) and one for reception (downlink). They are separated in time so that the mobile unit does not receive and transmit at the same time, a fact that simplifies the electronics.

The GSM BP lasts 15/26 milliseconds (ms) (or approximately 0.577 ms). Eight burst periods are grouped into a TDMA frame (120/26 ms, or approximately 4.615 ms), which forms the basic unit for the definition of logical channels, an endlessly recurring cycle of BP time slot transmissions.

Logical channels are defined by the number and position of their corresponding burst periods or time slots. The logical channels are used to exchange information between mobile stations and base stations. The logical channels are divided into dedicated channels, which are allocated to a mobile station, and common channels, which are used by mobile stations in idle mode. Within a logical channel, the transmission (downlink) to a mobile station occurs 3 timeslots earlier than the reception (uplink) from a mobile station.

The first carrier within a cell is called the Broadcast Control Channel (BCCH) carrier. The BCCH carrier transmits BCCH system information over timeslot 0, plus Access Grant Channels, Paging channels and most often SDCCH channels. The BCCH carrier has to be on at all times, so the mobiles in surrounding cells and in its cell can check the BCCH carrier signal on all timeslots. Another characteristic of the BCCH carrier signal is the base station transmitting the BCCH carrier signal does so with a constant output power. Even if traffic channels are in active use, creating potential interference with the BCCH carrier signal, the BCCH carrier signal is still transmitted with a constant output power on all timeslots. All other frequency carriers of a cell (TCH carriers) can be switched of if there is no traffic on the carrier/timeslot.

Conventional Power Control: To minimize co-channel interference and conserve power, both the mobiles and the base transceiver stations operate at the lowest power level that will maintain an acceptable signal quality. Power levels can be stepped up or down in steps of 2 dB from the peak power for the class down to a minimum of 13 dBm (20 milliwatts) or 2.5 mW in GSM 1900. The power control is typically done on the TCH carriers. Mobile and base stations need only transmit enough power to make a connection. Any more is superfluous, and using less power means less interference.

The mobile and base station measures the signal strength and signal quality (based on the Bit Error Ratio), and passes the information to the Base Station Controller, which ultimately decides if and when the power level should be changed in either the mobile or the base station. Power control needs to be handled carefully, since there is the possibility of instability. This arises from having a mobile increase its power in response to increased co-channel interference caused by another mobile increasing its power.

In contrast to conventional use of GSM timeslot allocation management to control interference, the present invention uses a timeslot allocation management to reduce the number of frequencies required to control interference between neighboring cells (intercell interference control). A mechanism for such a capability is provided for both macro base stations and pico or personal base stations.

SUMMARY OF THE INVENTION

U.S. application Ser. No. 10/280,733, filed Oct. 25, 2002 and having common assignee, proposes a portable, low power base station configured to convey wireless traffic between a mobile base station and a conventional wireless network via the Internet. The base station may be referred to as a "personal" or "pico" base station ("PBS"), and is configured to connect to the Internet at a user-selected location and establishes a small area of wireless coverage within a greater macrocell network. The user sets the operating parameters of the base station. U.S. application Ser. No. 10/280,733 is incorporated by reference, and its subject matter has been published in corresponding International Publication No. WO 2004/040938.

The present invention provides a method for enabling a network of indoor pico or personal base stations (PBSs) meeting the criteria set forth in the background section above. In particular, the method enables a network of pico or personal base stations, using one or two unused frequencies, to provide an acceptable level of services within an existing carrier network of macro base stations. This is accomplished by controlling interference between neighboring pico/personal base stations using various timeslot management mechanisms.

The present invention also provides a method to reduce the number of frequencies required to control interference between neighboring pico or personal base stations (PBS). The present invention comprises one or more of the following GSM TDMA timeslot resource management procedures: timeslot interference detection, timeslot power reduction, timeslot allocation, timeslot offset calibration, and timeslot synchronization. One or more of these resource management procedures are applied to both BCCH and TCH timeslot resources. There are many configurations (mechanisms and embodiments) to achieve this function.

It is important to note that this invention benefits a carrier rolling out an indoor pico/personal base station network whether the carrier elects to implement either a shared or unused frequency planning strategy for the PBS network. It is also important to note that this invention is not only applicable to inter-cell interference control between PBS cells, but also between PBS and macro base station cells as well in a shared strategy.

Figure 1:
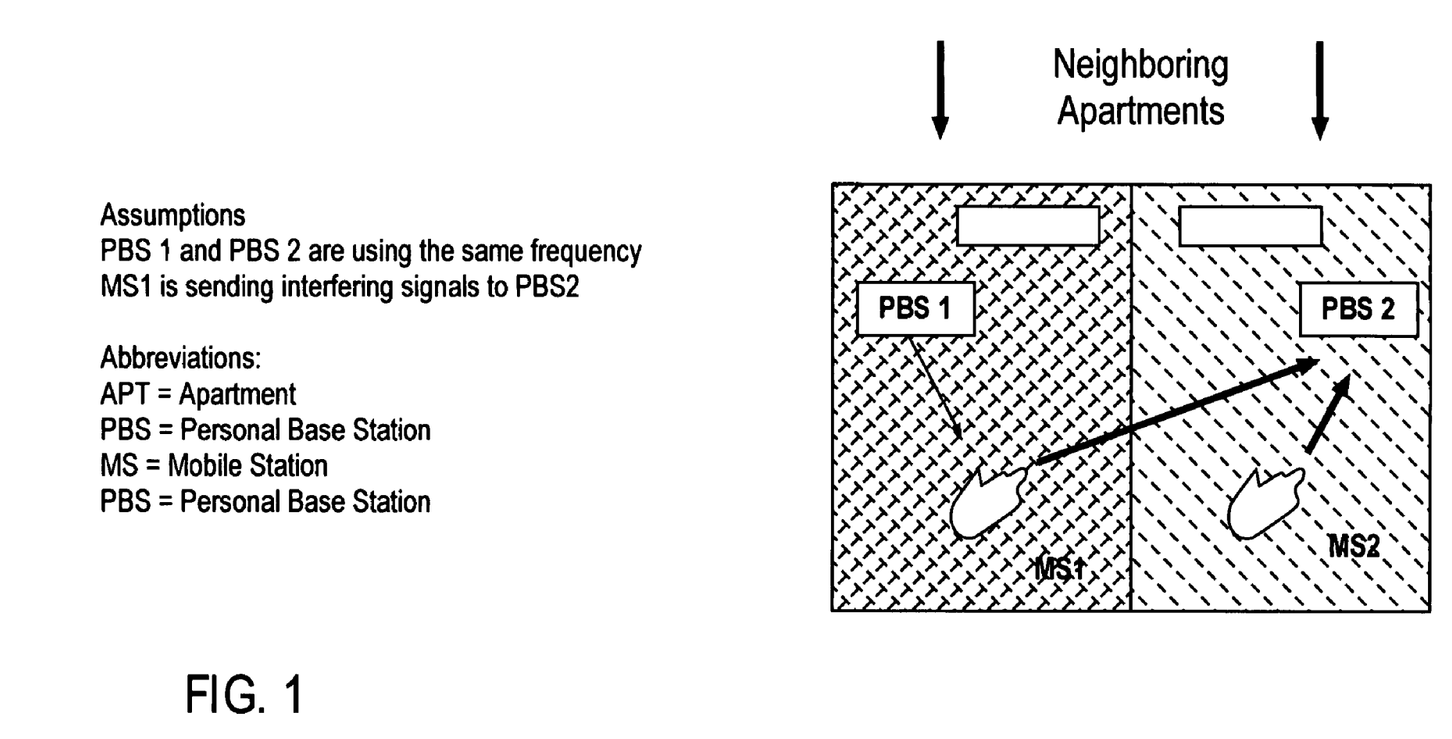
FIG. 1 is a block diagram showing interference between mobile stations located in neighboring PBS cells in adjoining apartments.
Figure 2:
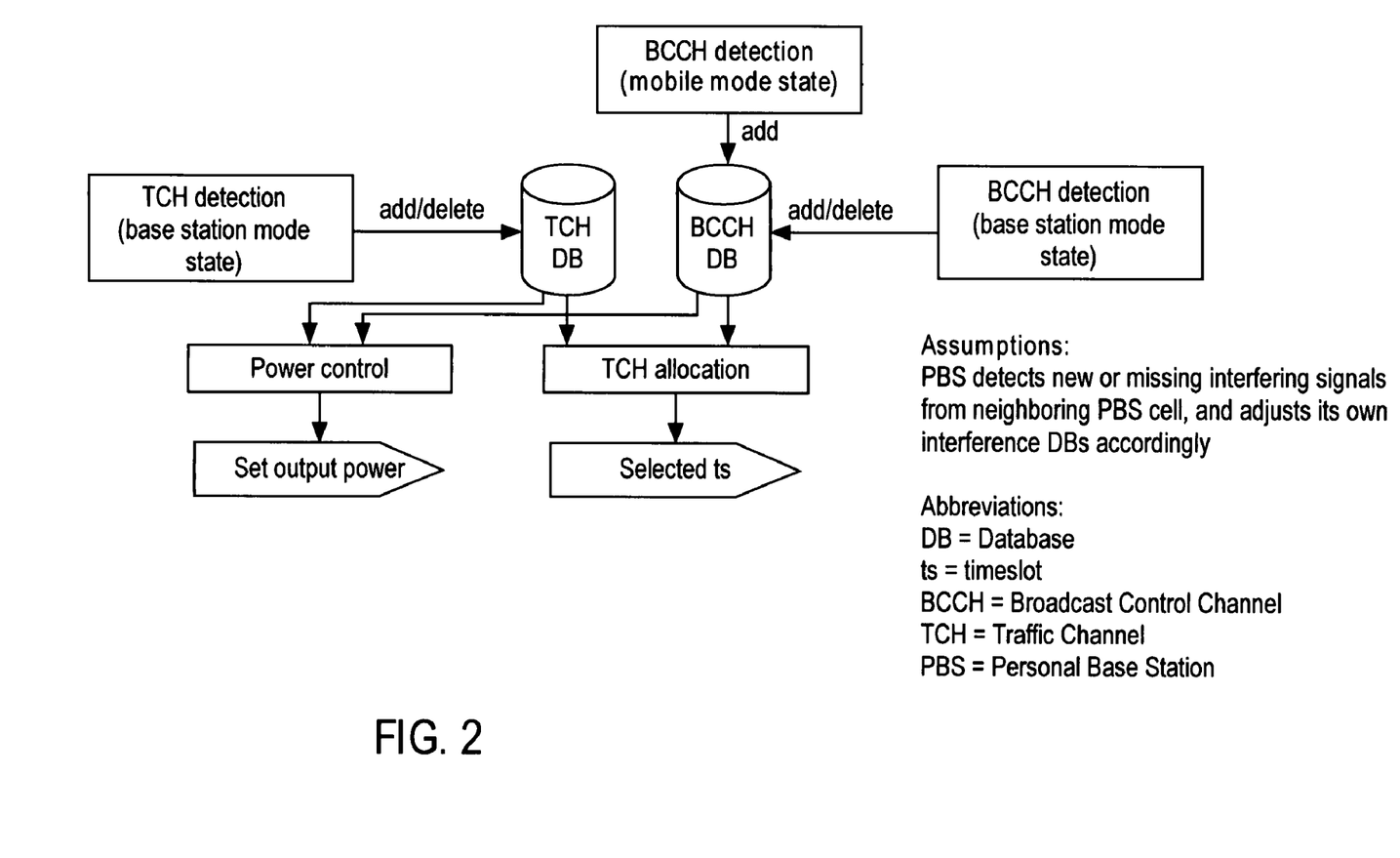
FIG. 2 is a block flow diagram showing how PBS TCH and BCCH DBs are maintained and used to manage timeslot resources.
Figure 3:
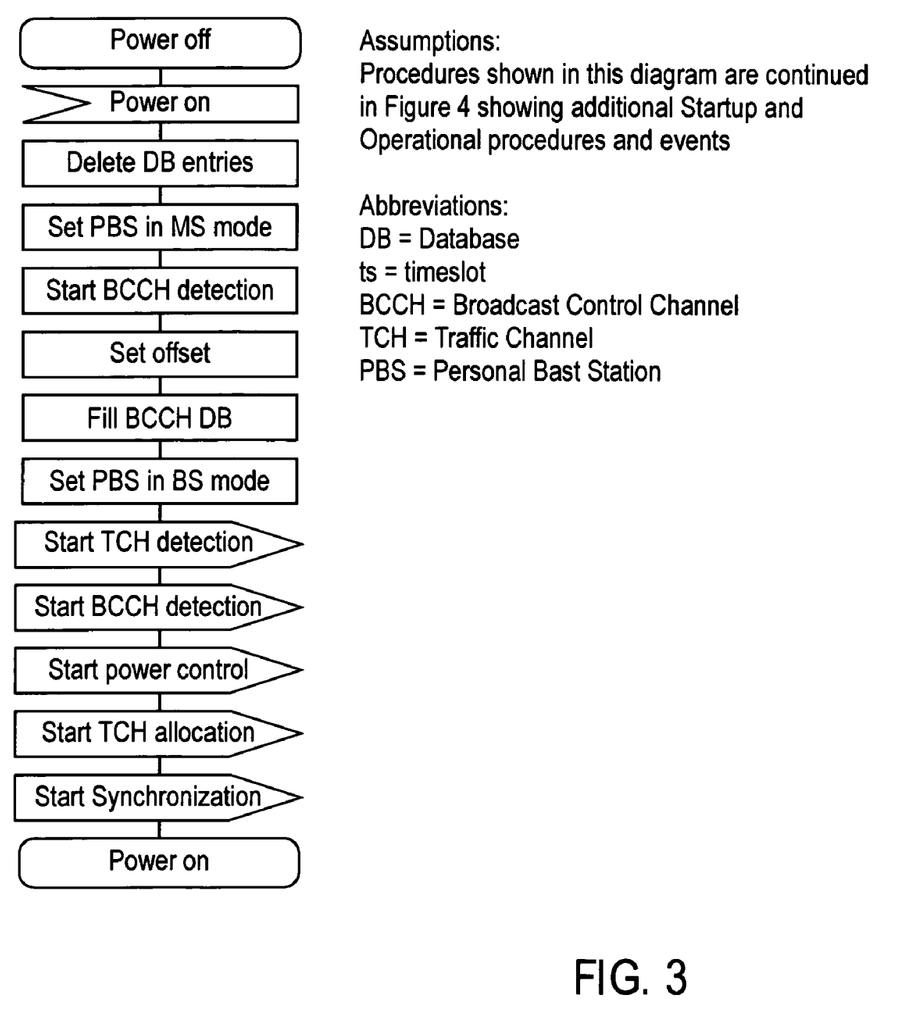
FIG. 3 is a block flow diagram showing the PBS Power-On Startup procedure.
Figure 4:
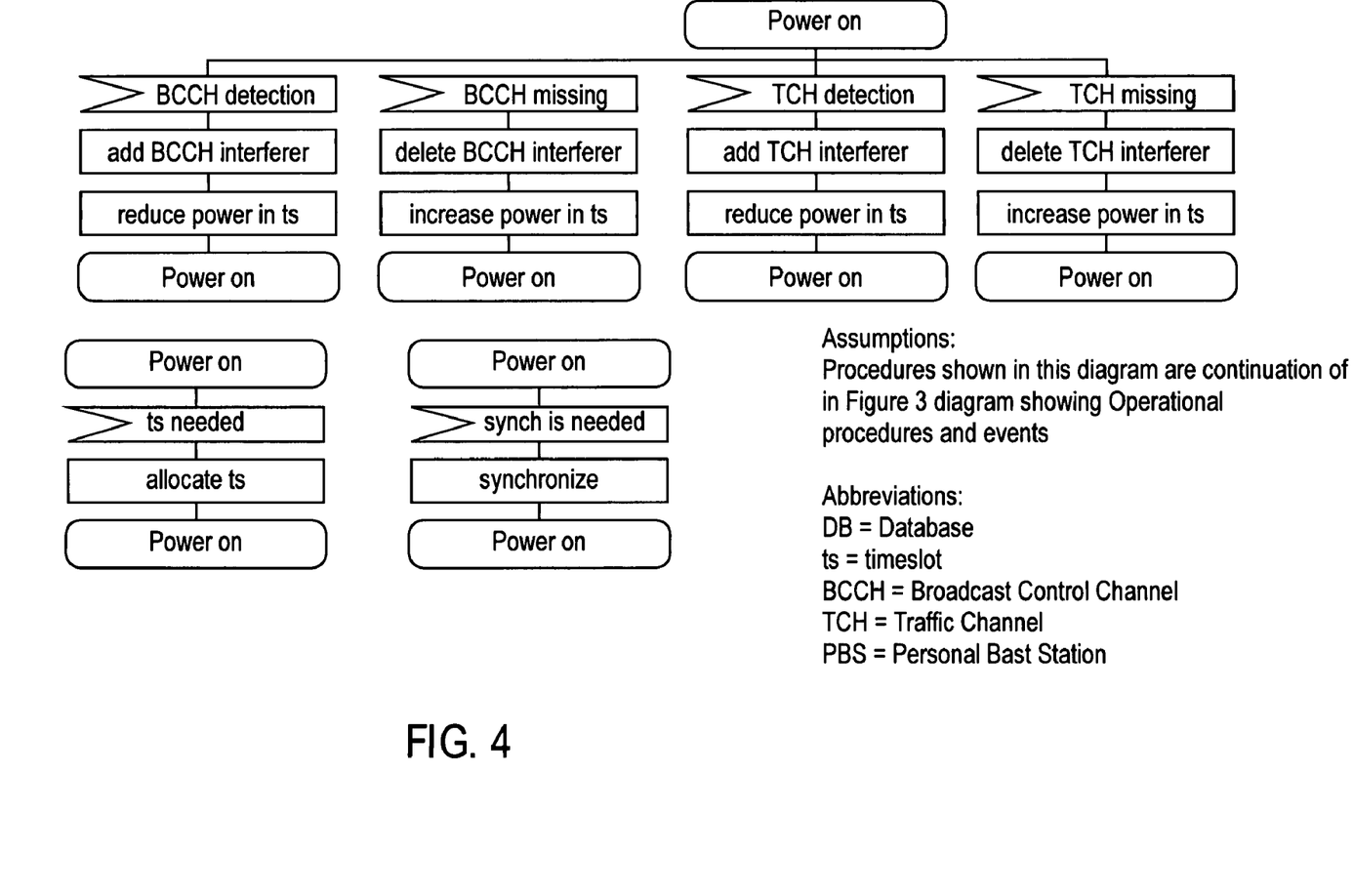
FIG. 4 is a block flow diagram is a continuation of FIG. 3 showing the PBS operational procedures that continuously update the BCCH/TCH DBs and the ongoing procedures that continuously manage timeslot resources.

The principles underlying the PBS interference detection and resource management procedures are straightforward. FIG. 1 shows two neighboring PBS cells with interfering mobile signals. FIG. 2 illustrates the process flow model for initializing, updating, and maintaining two PBS interference detection databases. FIGS. 3 and 4 illustrate the "Power off" state with the event "Power on" (Power On Startup Procedure) and "Power On" state operational procedures for timeslot interference detection, interference database updates, and timeslot resource management.

As illustrated in FIG. 2, each PBS maintains its own interference databases. The two PBS databases shown are used to track TCH and BCCH timeslot interference for neighboring PBS units. The BCCH DB is a long-term database (i.e. weeks and months), adjusting its active interference timeslot list to reflect the comings and goings of neighboring PBS units. The TCH is a short-term database (i.e. minutes, hours, and days), adjusting its active interference timeslot list to reflect the real time mobile services provided by neighboring PBS units.

The PBS units operate in one of two modes. During the "Power On Startup" procedure the PBS is in mobile mode (i.e. receive on the downlink frequency), and in "Power On" state the PBS switches intermittently back and forth from normal base station mode (i.e. transmit on the downlink frequency and receive on the uplink frequency) to sampling mode (similar to mobile mode) as necessary to detect BCCH interfering signal.

As embodied in this invention, during the "Power On Startup" procedure, the PBS detects BCCH signals from a neighboring PBS and adds interfering timeslots to it active list. In "Power On" state, the PBS switches intermittently to a Sampling Mode to detect BCCH signals from a neighboring PBS and either adds timeslots (when signal is detected) or deletes timeslots (when the absence of a previously detected signal is noted over a long period of time, e.g. months) to or from its BCCH DB active interference list. Coincidentally, as embodied in this invention, the PBS, when in "Power On" state, also detects TCH signals from neighboring mobiles and adds or deletes timeslots in real time from its TCH DB active interference list.

Whenever there is a change of state in either the BCCH DB or TCH DB (i.e. the addition or deletion of interfering timeslots to the DB), or various flags or counters indicate TCH or BCCH timeslot interferers have been detected, the PBS takes steps to manage the timeslot resources appropriately by performing one or more of several procedures, as appropriate: timeslot allocation (selecting non-interfering timeslots for future mobile service requests), timeslot power control (decreasing power on interfering timeslots and increasing power on non-interfering timeslots), timeslot offset calibration (offsetting BCCH TDMA timeframes to avoid interfering with neighboring PBS control signals), and or timeslot synchronization (synchronizing TDMA timeframes with those of neighboring PBS units to avoid interference problems associated with timeslot frequency drift).

Timeslot allocation as embodied in this invention is a procedure for selecting non-interfering timeslots that are not on the PBS active interference DB lists for use by future mobiles requests within the local PBS cell.

Timeslot power control as embodied in this invention is a procedure that reduces PBC local cell broadcast strength on interfering timeslots in active use by neighboring PBC cells. Power levels are reset to their original levels when the local PBS cell is no longer receiving interfering signals.

Timeslot offset calibration as embodied in this invention is a procedure for the local PBS cell offset its BCCH TDMA timeframe to avoid interference by avoiding use of the same BCCH timeframe used by the neighboring PBS cell.

Timeslot synchronization as embodied in this invention is a procedure for the local PBS cell to synchronize its TDMA timeframe clock with a central clock reference, like GPS, the Internet or those of neighboring PBS units in order to avoid interference problems associated with timeslot frequency drift.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the application.

BRIEF DESCRIPTION OF THE DRAWINGS

The foregoing and other systems, methods, features, and advantages of the present invention will be more readily understood upon consideration of the following detailed description of the invention, taken in conjunction with reference to the accompanying drawings. The elements (components) in the drawings are not necessarily to scale, emphasis instead being placed upon clearly illustrating the principles of the present invention and the relationships between the elements. Moreover, in the drawings, like (identical) text reference or text descriptions designate corresponding elements (components) consistently in the multiple figures or diagrams.

DETAILED DESCRIPTION OF THE PREFERRED EMBODIMENTS

Introduction

U.S. application Ser. No. 10/280,733, filed Oct. 25, 2002 and having common assignee, proposes a portable, low power base station configured to convey wireless traffic between a mobile base station and a conventional wireless network via the Internet. The base station may be referred to as a "personal" or "pico" base station ("PBS"), and is configured to connect to the Internet at a user-selected location and establishes a small area of wireless coverage within a greater macrocell network. The user sets the operating parameters of the base station. U.S. application Ser. No. 10/280,733 is incorporated by reference, and its subject matter has been published in corresponding International Publication No. WO 2004/040938.

1.0 Implementation

The embodiment of the present invention can be viewed as a method consisting of one or more of the following resource management procedures: timeslot interference detection and database update, timeslot power reduction, timeslot allocation, timeslot offset calibration, and timeslot synchronization. One or more of these resource management procedures is applied to both TCH and BCCH GSM TDMA timeslot resources. Section 2.0 describes the PBS Startup procedures that initially detects interference between neighboring PBS cells (FIG. 1), fills the interference BCCH/TCH DBs (FIG. 2), and subsequently implements timeslot resource startup management (FIGS. 3-7). Section 3.0 describes the PBS Operational procedures that continuously detect interference, update the interference BCCH/TCH DBs, and continuously manage timeslot resources (FIGS. 2-7).

2.0 PBS Startup Power On Procedure

When a new PBS is initially activated or an existing PBS comes alive following some event such as a connection to the Internet or power outage, it starts the Power On Startup procedure illustrated in FIG. 3. Embodiments of these Power On Startup procedures are described below in Sections 2.1 through 2.6

2.1 Power On Startup

One embodiment of the Power On procedure occurs whenever a PBS loses electrical power, either because of a power outage or because its on-off switch was toggled to the off position. Following the power outage or toggling of the on-off switch to the "on" position, the PBS resets itself to the Startup Mode.

Another embodiment of Power On occurs whenever the PBS is disconnected from the Internet. When the PBS is reconnected to the Internet, the PBS resets itself to the Startup Mode.

Another embodiment of Power On occurs whenever the PBS compares the most recent TCH data entry with the current time clock. If the time difference (TD) between the most recent entry and the current time clock is greater than a specified time difference limit (TD-int), such as 7 days, then the PBS resets itself to the Startup Mode.

2.2 Delete DB Entries

Each PBS maintains its own interference databases (see FIG. 2). The two PBS databases are used to track TCH and BCCH timeslot interference for neighboring PBS units (see FIG. 1). The BCCH DB is a long-tend database (i.e. weeks and months), adjusting its active interference timeslot list to reflect the comings and goings of neighboring PBS units. The TCH is a short-term database (i.e. minutes, hours, and days), adjusting its active interference timeslot list to reflect the real time mobile services provided by neighboring PHS units.

One embodiment of the Delete DB Entries procedure is to delete all active entries from the PHS TCH and BCCH DBs (FIG. 2) whenever the PHS detects that it is in the Startup Mode, based on the embodiments for Power On set forth in Section 2.1 above.

2.3 Set PBS in MS Mode

When the PBS is powered-on, it initially enters into a startup mobile station mode rather then the base station mode. While in mobile mode, the PHS can receive downlink data sent by other base stations, just like any other mobile station. While in the mobile mode, it is important to note that the PHS transmits no signals.

The exemplary embodiments for Setting the PHS in MS mode are similar to the embodiments set forth in Section 2.2 above for the Delete DB Entries procedure. One embodiment of the Set PHS in MS Mode procedure is to have the PHS automatically enter the Startup Mobile Mode whenever the PHS detects that it is in the Startup Mode, based on the embodiments set forth in Section 2.1 above.

2.4 Start BCCH Detection

When in Mobile Mode, the PHS does not transmit or provide services to the mobiles, but searches for other neighboring PHS cells broadcasting BCCH signals on the assigned frequency. This is illustrated in FIG. 1. While scanning in mobile mode, the PBS detects interfering timeslots using one or more procedures.

One exemplary embodiment of interference detection is the following procedure. While in Mobile Mode, the PBS scans for BCCH signals in all timeslots on the assigned frequency. If the PBS can detect any BCCH messages in the downlink path it will add this timeslot to the BCCH DB.

Another exemplary embodiment requires that any BCCH timeslot interference signals detected need to exceed a preset FS-BCCH threshold. If that threshold is exceeded, a Flag (F-int) or any yes/no binary indicator is set to indicate an interference condition is occurring for a particular timeslot (e.g. true), indicating BCCH Detection. For example, BCCH timeslot interference is detected if PBS can receive BCCH messages and the received field strength of the downlink path exceeds FS_BCCH (e.g. −80 dBm).

Another embodiment for interference detection is entirely independent of the absolute field strength. While in Startup Mobile Mode, the PBS scans for BCCH signals on assigned frequencies. Whenever a decoded BCCH signal is detected, interference is occurring and the timeslot interference Flag or yes/no binary indicator is set (e.g. true), indicating BCCH Detection.

2.5 Set BCCH Offset

The Set BCCH Offset procedure sets its own BCCH timeslot for a PBS during the Power On procedure that its timeframe is offset by one or more timeslot increments against interfering BCCH timeslots. An example of BCCH timeslot offset may be seen in FIG. 6.

One embodiment of the Set BCCH Offset procedure is as follows. Before the Offset occurs, a PBS detects one or more BCCH signals from interfering PBS cell(s) on one or more of its timeslots (e.g. timeslot 2 in FIG. 6) using one of the BCCH detection embodiment procedures described in Section 2.4 above. The PBS then resets (recalibrates) its TDMA framing so that the interfering BCCH signal originally detected in one PBS timeslot (e.g. timeslot 2 in FIG. 6) is subsequently detected in a different timeslot (e.g. timeslot 6 in FIG. 6). Note that because this procedure is done in "mobile mode", the offset must take into consideration the BS-MS delay offset. The BCCH offset procedure is considered "correct", if later, after the PBS switches to base station mode, its own BCCH timeslot and all interfering BCCH timeslots from neighboring PBS cells are not overlapped.

2.6 Fill BCCH DB

The BCCH DB is a long-term database, adjusting its active interference timeslot list to reflect the comings and goings of neighboring PBS units. One embodiment of the Fill BCCH DB procedure for a PBS in the Mobile Mode uses the timeslot interference flags or any other binary indicators that were set to "True" in the Start BCCH Detection Procedure (see Section 2.4) above in order to identify and add active interference timeslots to the BCCH DB. Even though the maintenance of the BCCH DB might be a long term process, the initial fill procedure occurs in a matter of seconds.

2.7 Set PBS in BS Mode

After filling the BCCH DB, the PBS switches from MS mode to BS mode. While in BS mode, the PBS receives in the frequency band where the mobiles are transmitting and transmits in the frequency band where other base stations transmit. In other words, it receives in uplink and transmits in downlink, like any other standard base station.

2.8 Start Other Procedures

During the "power on" transition, several messages are sent to initiate different processes (procedures); so that once the "power on" state is reached these functions are active. Start Other Procedures includes the following examples. "Start TCH detection" which starts the TCH detection process and continuously monitors the timeslots. "Start Power Control", which starts the power control/power reduction process. Similar is "Start BCCH detection" and "Start synchronization". The details are described in the following paragraphs.

3.0 PBS in "Power on" State

Once a PBS is in "Power On" state, more processes become active (see above) and generate events described in FIG. 4. The procedures in "Power On" state are described below in Sections 3.1 through 3.6.

Start TCH Detection (TCH Detection/TCH Missing)

Figure 5:
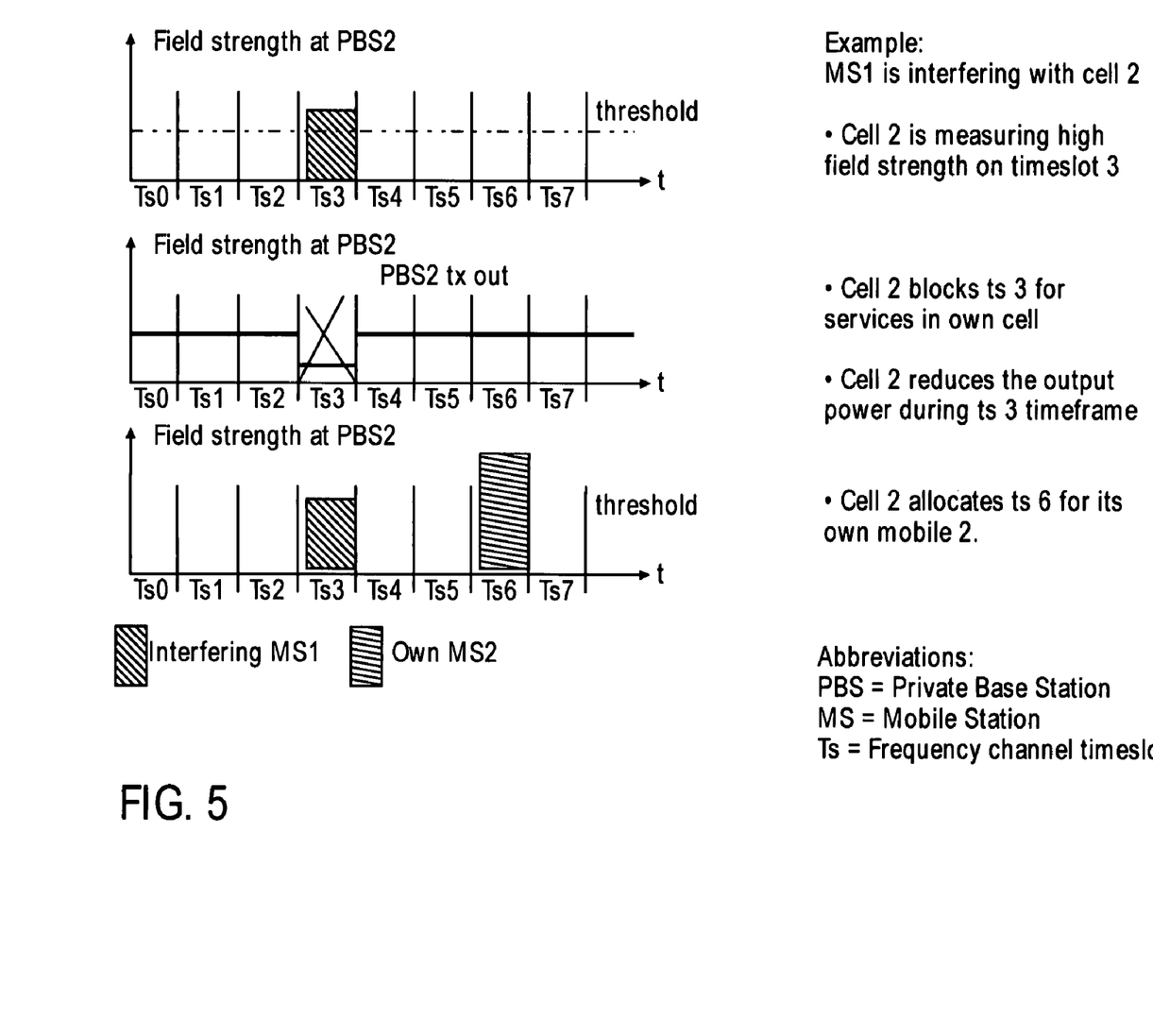
FIG. 5 is a block diagram showing logical timeslot allocation and power reduction resource management to control interference between neighboring PBS cells.
Figure 6:
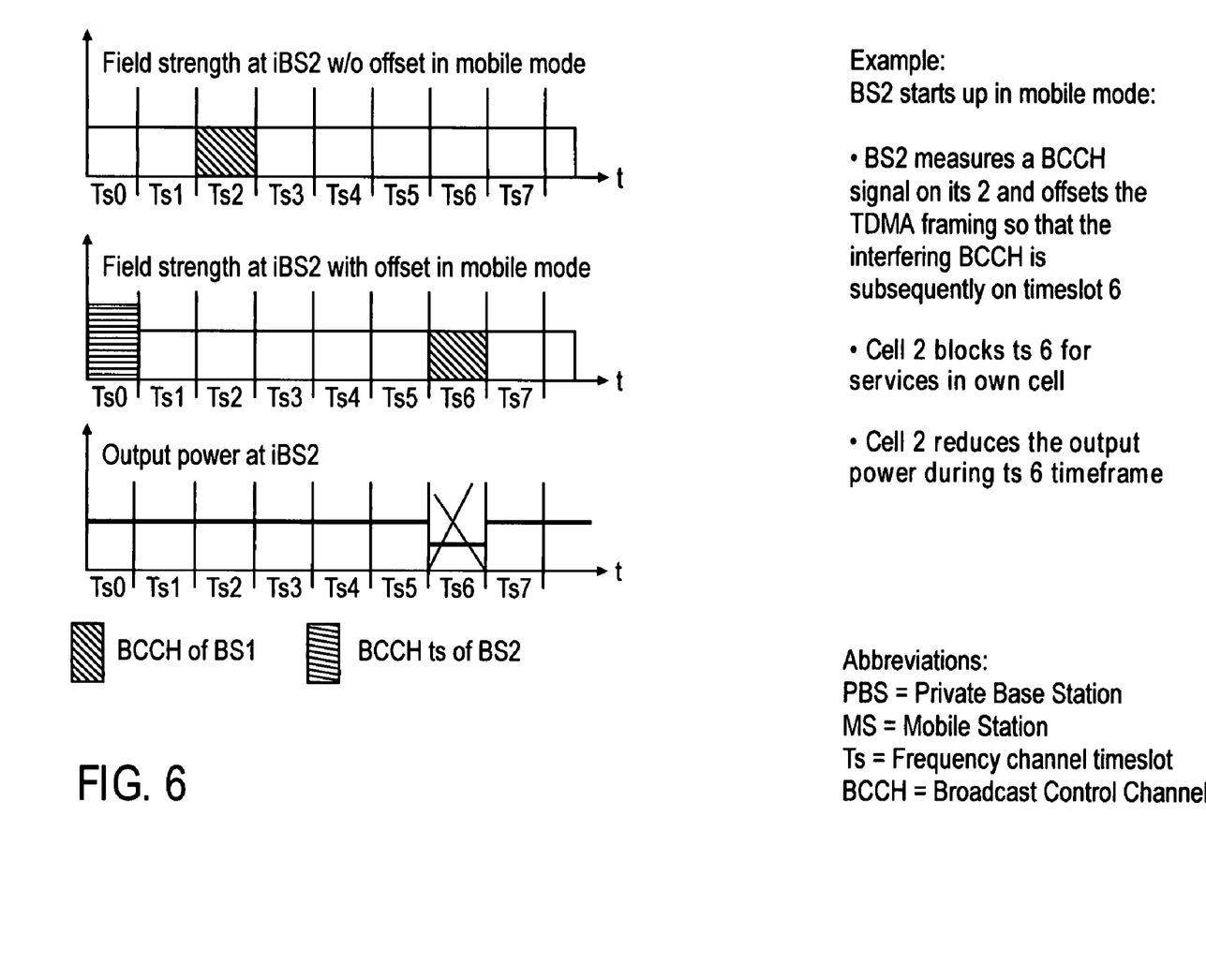
FIG. 6 is a block diagram showing initial PBS Startup with BCCH timeslot offset calibration, and subsequent timeslot resource management.

In order to control inter-cell timeslot interference, the present invention detects interference occurrences (TCH Detection) or absence of occurrences (TCH Missing) by monitoring measured field strength of its idle time slots in the personal base station and counting interference occurrences (see FIG. 5).

One exemplary embodiment of interference occurrence monitoring and counting begins by defining a field strength threshold interference limit: FS-int (e.g. −75 dBm). Using this threshold limit, timeslot signal samples are taken (monitored) and the number of timeslot interference occurrences identified (counted). A duration for timeslot signal monitoring is set (e.g., a duration of one timeslot, although it might be shorter to account for asynchronous issues) and for each sample signal above or below the threshold limit FS-int, a counter N-int is modified (i.e. incremented or decremented by some value, as appropriate).

One exemplary embodiment of TCH Detection (interference occurrence) is the following procedure. Whenever a sampled timeslot measured field strength (FS) exceeds the FS-int threshold, a counter (N-int) will be incremented by a designated number (e.g. 1). Conversely, if the FS-int threshold is not reached, the counter N-int will be decremented by a designated number (e.g. 1). As soon as the counter N-int reaches a limit UP-int (e.g. 3), the interference condition is met, indicating TCH Detection. The counter N-int is allowed to increase until an upper limit UPPER-int (e.g. 5.) is reached. If a sample does not reach the FS-int threshold, the counter N-int is reduced by a designated number (e.g. 1) until the value 0 is reached. The interference condition is no longer valid as soon as the counter reaches the value limit LOWER-int (e.g. 2), indicating TCH Missing. It should be noted that the procedure could be reversed, which means, the counter can be decreased if the threshold is reached and increased if the threshold is not reached.

Another exemplary embodiment of TCH Detection (interference occurrence) is the following procedure. Whenever the measured field strength (FS) exceeds the FS-int threshold, a Flag (F-int) or binary yes/no indicator will be set to indicate an interference condition has occurred (e.g. true), indicating TCH Detection. Whenever a measurement is done and the field strength being monitored (received) does not exceed the FS-int threshold, the Flag (F-int) or binary yes/no indicator will be set to indicate an interference condition has not occurred (e.g. false), indicating TCH Missing.

3.2 Start BCCH Detection (BCCH Detection/BCCH Missing)

BCCH Detection while in "power on" state is similar to BCCH Detection during the power on Startup procedure (Section 2.4). While in base station mode, the PBS can switch to a sampling or receiving mode for idle timeslots.

One embodiment of Switching to Sampling Mode for idle timeslots is as follows. The PBS determines which timeslots are idle, i.e. those timeslots neither in use for BCCH information nor in use for active calls. For those idle timeslots, the PBS switches off its transmitter, and reverses the receiving band by adjusting the receiver to the previous transmit frequency (switching from downlink to uplink mode). The PBS is then able to take samples of the downlink timeslots from other base stations operating on the same or other frequencies. Note when doing this, both transmitting and receiving timeslots of the PBS must be idle. This means that no timeslot is transmitting in downlink and no timeslot is receiving in uplink from an active mobile in the cell.

One exemplary embodiment of interference detection is the following procedure. First all timeslots are scanned. If the PBS detects any BCCH messages in the downlink path, indicating BCCH Detection, it will add this timeslot to the BCCH DB. If the PBS does not detect any BCCH message in the downlink path, indicating BCCH Missing, it will delete this timeslot from the BCCH DB.

Another embodiment is that the detected BCCH timeslots interference signal must also exceed a present FS-BCCH threshold. If these conditions are met a Flag (F-int) or any yes/no binary indicator is set to indicate an interference condition is occurring for a particular timeslot (e.g. true), indicating BCCH Detection. If these conditions are not met a Flag (F-int) or any yes/no binary indicator is reset to indicate an interference condition is not occurring for a particular timeslot (e.g. false), indicating BCCH Missing. For example, BCCH timeslot interference is detected if PBS can receive BCCH messages and the received field strength of the downlink path exceeds FS_BCCH (e.g. −80 dBm).

Another embodiment is that the detection is done in the uplink mode, which means, the PBS will not switch to mobile mode during normal base station operation Instead the PBS will try to measure uplink-BCCH messages, like SDCCH and RACH Messages. Note, in this case the DB deletion process for a BCCH interferer occurs slowly (requiring weeks or months), whereas the DB addition process for BCCH interferers occurs rapidly (requiring minutes or hours). Only after a prolonged absence of interfering signals from mobiles in a neighboring PBS cell can it be assumed that the neighboring PBS is permanently inactive. As in the procedure for adding DB interferers, here too a counter can be implemented, e.g. N-noint. However, to detect a missing BCCH interferer a counter could be increased each time no BCCH message could be received. When the N-noint counter reaches a preset value (e.g. 10,000). When the N-noint reaches its preset value, a Flag (F-noint) or any yes/no binary indicator is set to indicate the absence of a BCCH interferer for a particular timeslot (e.g. false), indicating BCCH Missing.

Another embodiment of BCCH Detection is as follows. If an idle non-interfered timeslot is checked for a BCCH message and a BCCH message cannot be received, a counter (N-int) is reset (e.g. zeroed) and incremented by a predefined value each time a BCCH message is detected. This can either be done independent of the measured field strength or in combination with the requirement that the BCCH message also exceeds a minimum threshold. If the counter reaches the value N-BCCH-MAX (e.g. 2) the "BCCH detection condition is met and, a Flag (F-int) or any yes/no binary indicator is set to indicate BCCH interferer for a particular timeslot (e.g. true), indicating BCCH Detection.

Note that this procedure will also work if the increase/decrease procedure on the counter is reversed. For example, is a BCCH message is received, the counter will be decreased.

3.3 Update BCCH and TCH DBs (Add/Delete Interferers)

The BCCH DB is a long-term database (i.e. weeks and months), adjusting its active interference timeslot list to reflect the comings and goings of neighboring PBS units. The TCH is a short-term database (i.e. minutes, hours, and days), adjusting its active interference timeslot list to reflect the real time mobile services provided by neighboring PBS units. The PBS database configuration is illustrated in FIG. 2.

One embodiment of Updating BCCH and TCH DBs is as follows. Whenever the PBS detects a new TCH or BCCH interferer, or the absence of an interferer on an idle timeslot using one or more of the procedures embodied in Sections 3.1 (TCH Detection/TCH Missing) or 3.2 (BCCH Detection/BCCH Missing), the corresponding BCCH DB or TCH DB is adjusted appropriately by adding to or deleting from its list of active interference timeslots.

Start TCH Power Control (Reduce Power)

In order to control timeslot inter-cell interference, the present invention, in some, but not all situations, adjusts (reduces) the transmission power of selected timeslots of the PBS. Typically a BCCH carrier base station transmits its BCCH signal at a constant power level over all idle timeslots ("normal power"). This may interfere with mobiles in another cell. Therefore, this invention changes BCCH carrier timeslot power levels to help reduce interference. It does so for the following reasons. Unlike a macro cell, where base station power reduction may affect hundreds of mobiles, in the case of a PBS with a small cell area and low power output, only a few local neighboring mobiles are potentially affected. Furthermore, the impact of this power change is highly beneficial in reducing interference in neighboring cells, where even a small change in mobile position (i.e. just a few meters) results in a significant change in field strength. And lastly, full output power on all timeslots is only important when a mobile is located within the Macro-cell and close to the PBS cell, which can trigger a handover or a cell-reselection from the conventional macro cell to a PBS cell. However, this occurs infrequently. The measured field strength in the mobile is only affected if the mobile measures during a period when a timeslot is powered down. Even if the mobile measures this timeslot, the measured field strength is attenuated in direct proportion to the output power reduction (e.g. 6 dB).

FIG. 1 is a block diagram showing two adjacent apartments [APT 1 and APT 2] containing mobile stations [MS 1 and MS 2) and personal base stations (PBS 1 and PBS 2). In accordance with this invention, as soon as PBS 2 detects MS 1 as a potential interferer on a particular timeslot, PBS 2 will proceed to adjust (reduce) its output power on that timeslot, which will help to reduce interference on the downlink from PBS 2 to MS 1. FIG. 5 illustrates the effect on BCCH field strength in Timeslot 3 following the reduction of the PBS 2 output power. The effective signal to noise ratio on the traffic channel in timeslot 3 has been significantly reduced, thereby reducing the potential for any interference from PBS 2 on MS 1.

An exemplary embodiment to adjust PBS power is as follows. In the event that the PBS determines from its N-int counter or F-in flag or the TCH DB or BCCH DB that the output power for one of its timeslots needs to be reduced, it would Reduce Power by a constant designated value Tx-int db (e.g. 6 dB) ("interfered timeslot power"). Conversely, in the event that the PBS determines from its N-int counter or F-in flag or TCH DB or BCCH DB that the timeslot is not interfered, the output power for this timeslot is set to "normal power".

In the event that the PBS determines from its N-int counter or F-in flag or TCH DB or BCCH DB that the PBS output power needs to be reduced, another embodiment of this invention would Reduce Power for the PHS by the difference between the PHS field strength and the threshold field strength limit FS-int. For example, if FS-int=−80 dBm, and the measured field strength of interferer signal is=−75 dBm, then the output would be reduced by 5 db compared to the "normal power" level.

Start TCH Allocation

In order to control timeslot inter-cell interference, the present invention, in some, but not all situations, not only reduces the transmission power of selected timeslots used by an interfering PBS cell, but also blocks the use of interfered timeslots and allocates (assigns) unused and non-interfered timeslots to any new calls initiated by mobiles within its cell.

As can be seen in FIG. 5, in accordance with this invention, as soon as the personal base station [PBS 2] detects a potential mobile station [MS 1] interferer on Timeslot 3, in addition to reducing the output power on that timeslot (see above), which helps to reduce interference on the downlink (PBS 2~MS 1), PBS 2 not only blocks any new calls on Timeslot 3 from mobiles within its cell, it also allocates only unused and non-interfering timeslots, in this example, Timeslot 6 for any new calls initiated by a mobile station [MS 2] within its cell, which helps to avoid interference on the uplink (MS 2→PBS 1).

An exemplary embodiment to Start TCH Allocation of timeslots is as follows. As soon as a PBS detects an interferer on a specific timeslot from its N-int counter or F-in flags or BCCH DB and TCH DB, the PBS: a) denies use of (blocks) those timeslots to any mobiles requesting new service (new calls) within the detecting PBS cell area, and b) assigns (allocates) an unused and non-interfered timeslot (e.g. the one with the lowest measured field strength signal) to any mobiles requesting new service (new calls) within the detecting PBS cell. In case all timeslots have some interference, the timeslot with the least interfering level is chosen to provide services.

3.6 Start Synchronization

Figure 7:
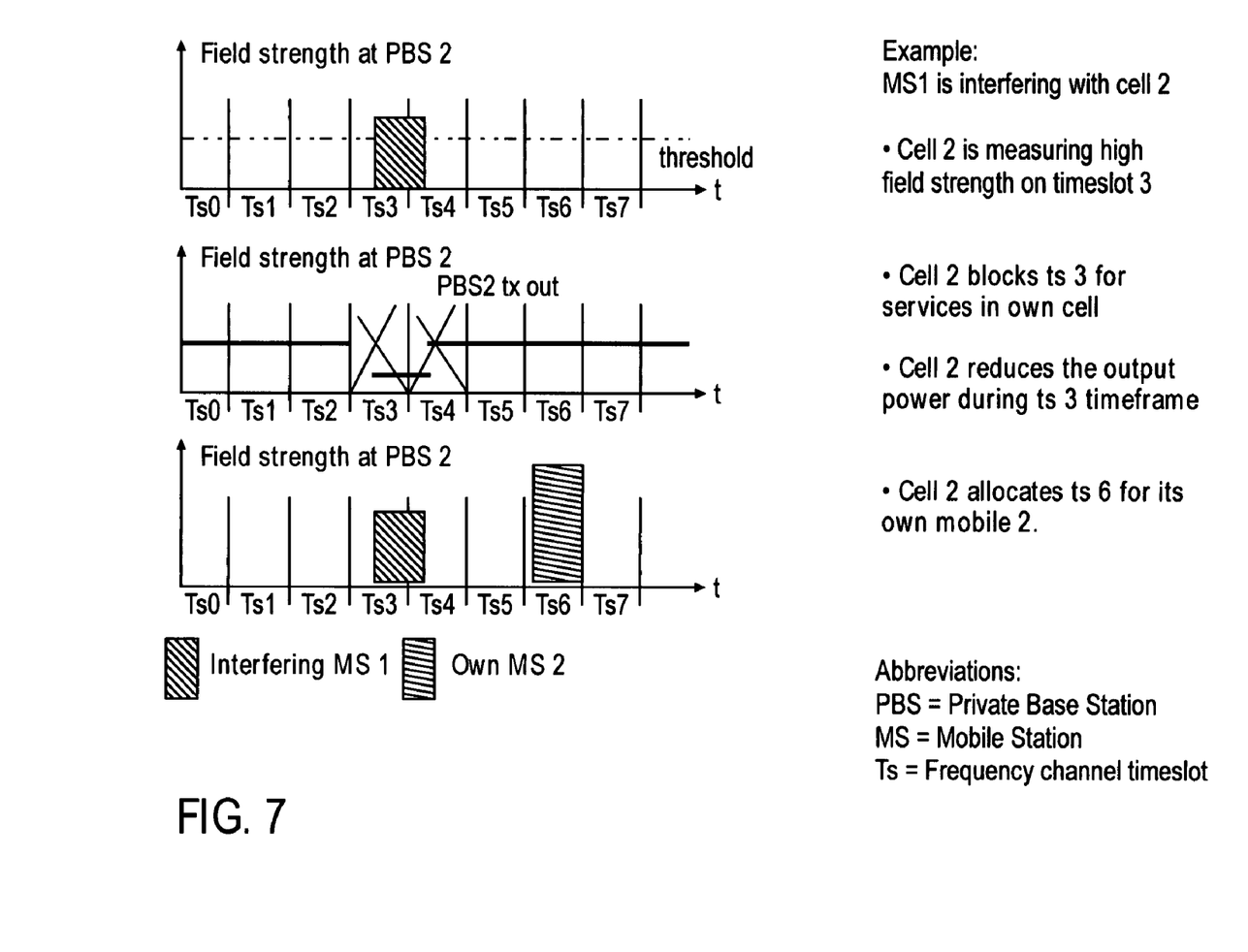
FIG. 7 is a block diagram showing the impact on field strength when timeslots between base stations become asynchronous.

The present invention provides for an additional, but optional procedure that implements BCCH timeslot synchronization in order to avoid interference on the BCCH timeslot and drift by neighboring PBS units. This is illustrated in FIG. 7. PBS 2 detects interference from MS 1 on Timeslot 3. Just as illustrated in FIG. 5, the PBS 2 proceeds to block Timeslot 3 services for mobiles within its own cell, reduce its own output power during Timeslot 3, and allocate an unused Timeslot (e.g. 6) for use by calls from mobiles within its own cell. The problem however, as shown in FIG. 2, is the physical timeslot in the two adjacent cells, Cell 1 and Cell 2, have become asynchronous over time, i.e. the relationship between timeslots in the two cells are no longer concurrent in time.

If the asynchronous drift between the two cells is not too severe, no action need be taken to correct the situation. The embodiments of the various methods and procedures described previously in this application should effectively reduce any interference from the detecting PBS cell. However, if the asynchronous drift becomes excessive, an additional procedure that synchronizes neighboring PBS cells is required.

Timeslot Synchronization may be accomplished by using either a universal reference clock to reestablish global synchronization (via GPS or Internet) between all PBS cells, or by using the BCCH carrier signal to reestablish local synchronization (via intercell receive mode) between just the nearest neighbor PBS cells.

One embodiment of this invention is to synchronize all PBS cells to the GPS reference clock. Another, similar embodiment of this invention is to synchronize all PBS cells to a single signal coming over the Internet Another embodiment of this invention is to have all PBS units periodically switch into receive mode on a predetermined time interval (e.g. every 60 seconds) in order to adjust its own TDMA frame to the BCCH signal from its nearest neighbor. This is possible because the PBS needs only to transmit on timeslot 0 for the BCCH and e.g. timeslot 1 if there is an active call. The remaining times slots could be used to tune to the duplex frequency and measure the field strength and detect the BCCH framing of the adjacent cell(s).

4.0 Applicable Technologies

Although many of the embodiments of the current invention described above are based upon GMS technology, the invention also supports other technologies, including CDMA, iDEN and 3 G/UMTS.

The scope of the invention also embraces embodiments where new pico, micro or macro cells are allocated either shared or new frequencies in an existing carrier network. The scope of this invention also applies to residential homes, public areas, businesses, campuses, airports, in any situation where new pico, micro, or macro base stations share frequencies. It is understood that the term timeslot is used in a logical sense, which means there is a timeslot in downlink e.g. ts 0 and a timeslot in uplink ts 0+3. This timeslot pair is called a logical timeslot and represents both timeslots in down- and uplink, which uses different frequencies separated by the duplex frequency.

5.0 Conclusion

In conclusion, it should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications or variations are intended to be included herein within the scope of this disclosure and the present invention.

The invention claimed is:

1. A personal base station configured to connect to the Internet and establish a small area of wireless coverage comprising:

means for controlling interference with neighboring personal base stations using a timeslot management mechanism that is configured to add and delete timeslots by selecting non-interfering timeslots for future service requests, to manage timeslot power by decreasing power on interfering timeslots and increasing power on non-interfering timeslots, and to synchronize timeslots with neighboring personal base stations to avoid interference associated with timeslot frequency drift, wherein interference is tracked using a short-term interference database and a long-term interference database, and further wherein the personal base station at least partially populates the short-term interference database and/or the long-term interference database while operating in a mobile station mode, the short-term interference database to track interference caused by mobile services provided by neighboring personal base stations and the long-term interference database to be populated utilizing information obtained from a Broadcast Control Channel (BCCH) while the personal base station is on mobile station mode by detecting interfering neighboring personal base stations on one or more time slots, wherein cell framing is recalibrated so that interference is detected in a different time slot.

2. A personal base station as claimed in claim 1, wherein the timeslot management mechanism comprises selecting non-interfering timeslots for mobile service requests.

3. A personal base station as claimed in claim 1, wherein the timeslot management mechanism comprises decreasing power on interfering timeslots while increasing power on non-interfering time slots.

4. A personal base station as claimed in claim 1, wherein the timeslot management mechanism comprises offsetting its broadcast control channel to avoid interference with neighboring broadcast control channels.

5. A personal base station as claimed in claim 1, wherein the timeslot management mechanism comprises synchronizing TDMA timeslots with those of neighboring PBS units to avoid interference problems associated with timeslot frequency drift.

6. A personal base station as claimed in claim 1, and further comprising an interference database for tracking-TCH and BCCH timeslot interference with neighboring personal base stations.

* * * * *